US012041698B1

(12) United States Patent
Zhang

(10) Patent No.: US 12,041,698 B1
(45) Date of Patent: Jul. 16, 2024

(54) HEATED CLOTHING AND CONTROL METHOD OF HEATED CLOTHING

(71) Applicant: Haizhen Zhang, Yuyao (CN)

(72) Inventor: Haizhen Zhang, Yuyao (CN)

( * ) Notice: Subject to any disclaimer, the term of this patent is extended or adjusted under 35 U.S.C. 154(b) by 0 days.

(21) Appl. No.: 18/359,366

(22) Filed: Jul. 26, 2023

(51) Int. Cl.
*H05B 1/02* (2006.01)
*A41D 13/005* (2006.01)

(52) U.S. Cl.
CPC ....... *H05B 1/0272* (2013.01); *A41D 13/0051* (2013.01); *H05B 2203/036* (2013.01)

(58) Field of Classification Search
CPC .. H05B 1/0272; H05B 2203/036; H05B 3/34; H05B 3/342; H05B 3/36; H05B 3/345; H05B 3/347; A41D 13/0051; A41D 13/002; A41D 13/005; A41D 13/0058
See application file for complete search history.

(56) References Cited

U.S. PATENT DOCUMENTS

2004/0195234 A1* 10/2004 Kaesler .................... H05B 3/36 219/544
2011/0186558 A1* 8/2011 Campbell ................ H05B 3/34 219/201
2023/0247729 A1* 8/2023 Granley ................. H05B 3/145 392/444
2023/0247732 A1* 8/2023 Che .......................... H05B 3/34 219/211

FOREIGN PATENT DOCUMENTS

CA 3086840 A1 * 1/2022 ............. A41D 1/002
KR 102349535 B1 * 1/2022

* cited by examiner

*Primary Examiner* — Shawntina T Fuqua
(74) *Attorney, Agent, or Firm* — Daniel M. Cohn; Howard M. Cohn

(57) ABSTRACT

A heated clothing and a control method of the heated clothing are provided. The heated clothing includes a clothing main body, a plurality of flexible heating sheets, and a power supply line. The clothing main body includes a front portion and a rear portion, the front portion is disposed opposite to the rear portion. The plurality of the flexible heating sheets are disposed at intervals on the clothing main body, a first part of the plurality of the flexible heating sheets are disposed at the front portion, and a second part of the plurality of the flexible heating sheets are disposed at the rear portion, and each of the plurality of the flexible heating sheets is bendable. The power supply line is electrically connected to each of the plurality of the flexible heating sheets to supply power to each of the plurality of the flexible heating sheets.

18 Claims, 8 Drawing Sheets

HEATED CLOTHING AND CONTROL METHOD OF HEATED CLOTHING

TECHNICAL FIELD

The present disclosure relates to a technical field of clothings, and in particular to a heated clothing and a control method of the heated clothing.

BACKGROUND

In cold winter, warmth retention property of clothings is an important index for selecting suitable clothings and is also a key consideration when people prepare to go out or to do some other things. For warmth retention issues, conventional clothings tend to increase thickness and add down feather to improve a warmth retention effect, so that clothings having good warmth retention effect are generally thicker and heavier. However, the thicker and heavier clothings may provide inconvenience to the people in movement, and may further affect a comfort level to the people wearing the clothings. With attention of the people to fashion, more and more people like to wear thinner clothings, and in order to solve the warmth retention issues of the thinner clothings, clothings capable of heating are proposed, but current clothings capable of heating are poor in the warmth retention effect.

SUMMARY

The present disclosure provides a heated clothing and a control method of the heated clothing, which is capable of providing a better warmth retention effect.

The present disclosure provides a heated clothing, including a clothing main body, a plurality of flexible heating sheets, and a power supply line. The clothing main body includes a front portion and a rear portion, the front portion is disposed opposite to the rear portion. The plurality of the flexible heating sheets are disposed at intervals on the clothing main body, a first part of the plurality of the flexible heating sheets are disposed at the front portion, and a second part of the plurality of the flexible heating sheets are disposed at the rear portion, and each of the plurality of the flexible heating sheets is bendable. The power supply line is electrically connected to each of the plurality of the flexible heating sheets to supply power to each of the plurality of the flexible heating sheets.

In some embodiments, a number of the first part of the plurality of the flexible heating sheets is greater than a number of the second part of the plurality of the flexible heating sheets.

In some embodiments, the heated clothing further includes a plurality of flexible waterproof sleeves, each of the plurality of the flexible heating sheets is sleeved by one of the plurality of the flexible waterproof sleeves.

In some embodiments, pockets are disposed on the front portion or the rear portion. The front portion includes a front side and a rear side, the front side and the rear side form each of the pockets, the front side includes a heat insulation layer, the rear side includes a first heat conduction layer and a second heat conduction layer, and one of the plurality of flexible heating sheets is disposed between the first heat conduction layer and the second heat conduction layer.

In some embodiments, pockets are disposed on the front portion. The front portion includes a front side and a rear side, the front side and the rear side form each of the pockets, the front side includes a heat insulation layer and a first heat conduction layer, the rear side includes a second heat conduction layer, and one of the plurality of flexible heating sheets is disposed between the heat insulation layer and the first heat conduction layer.

In some embodiments, the clothing main body includes an inner layer, and the heated clothing further includes flexible heat conduction sheets, the flexible heat conduction sheets are disposed between the plurality of the flexible heating sheets and the inner layer, and an area of each of the flexible heat conduction sheets is greater than an area of the plurality of the flexible heating sheets.

In some embodiments, the power supply line includes a connecting line, power supply interfaces, and a control button. The connecting line is electrically connected to each of the plurality of the flexible heating sheets, the power supply interfaces are connected to the connecting line to supply the power to each of the plurality of the flexible heating sheets, and the control button is connected to the connecting line to control each of the plurality of the flexible heating sheets to be connected or disconnected.

In some embodiments, pockets are disposed at the front portion, and the power supply interfaces are disposed corresponding to the pockets.

In some embodiments, the power supply interfaces are disposed in the pockets, the pockets are configured to accommodate power supply devices, and the power supply interfaces are configured to plug into the power supply devices.

In some embodiments, the front portion includes a front side and a rear side, the front side and the rear side form each of the pockets, each of the power supply interfaces includes a wireless charging coil, the wireless charging coil is disposed in the inner layer, and the wireless charging coil is configured to wirelessly cooperate with a wireless transmitting coil of an external device for supplying power to each of the plurality of the flexible heating sheets.

In some embodiments, each of the power supply interfaces further includes a first magnetic component, the first magnetic component is disposed adjacent to the wireless charging coil, the first magnetic component is configured to magnetically connected to a second magnetic component of the external device, so as to align the wireless charging coil with the wireless transmitting coil.

In some embodiments, the heated clothing further includes a plurality of temperature sensors, at least one of the plurality of the temperature sensors is disposed on each of the plurality of the flexible heating sheets, and when a temperature collected by any one of the plurality of the temperature sensors exceeds a temperature threshold, a corresponding one of the plurality of the flexible heating sheets is controlled to stop heating.

In some embodiments, the heated clothing further includes a plurality of temperature sensors and a communication unit. At least one of the plurality of the temperature sensors is disposed on each of the plurality of the flexible heating sheets, and each of the plurality of the temperature sensors is configured to collect temperature information. The communication unit is electrically connected to the plurality of the temperature sensors and is configured to transmit the temperature information to an external device.

In some embodiments, the communication unit is further configured to obtain a control instruction transmitted by the external device, at least one target heating sheet is selected from the plurality of the flexible heating sheets according to the control instruction, and the at least one target heating sheet is further controlled to stop heating or re-heating according to the control instruction.

In some embodiments, the communication unit is further configured to obtain a control instruction transmitted by the external device, and a temperature threshold corresponding to each of the plurality of the temperature sensors is confirmed according to the control instruction; and when the temperature information exceeds the temperature threshold, a corresponding one of the plurality of the flexible heating sheets is controlled to stop heating.

In some embodiments, each of the plurality of the flexible heating sheets includes first flexible heating sheets and at least one second flexible heating sheet. The power supply line includes a first line and a second line, the first line is electrically connected to the first flexible heating sheets, the second line is electrically connected to the at least one second flexible heating sheet, and power transmitted by the first line is different from power transmitted by the second line.

In some embodiments, the first line includes a first adjusting circuit, the second line includes a second adjusting circuit, the first adjusting circuit is capable of adjusting working power of the first flexible heating sheets, and the second adjusting circuit is capable of adjusting working power of the at least one second flexible heating sheet.

In some embodiments, the power supply line includes an increase button and a decrease button. When the increase button is triggered, working power of the plurality of the flexible heating sheets is increased; and when the decrease button is triggered, working power of the plurality of the flexible heating sheets is decreased.

The present disclosure further provides a control method of the heated clothing as foregoing, including:

- obtaining a temperature of each of the plurality of the flexible heating sheets; and
- controlling a corresponding one of the plurality of the flexible heating sheets to stop heating when a temperature of any one of the plurality of the flexible heating sheets exceeds a temperature threshold.

In some embodiments, the control method of the heated clothing further includes:

- obtaining an ambient temperature; and
- adjusting the temperature threshold according to the ambient temperature, where the temperature threshold is inversely related to the ambient temperature.

In embodiments of the present disclosure, the plurality of the flexible heating sheets are distributed at the front portion and the rear portion, so that users may feel heat provided by the plurality of the flexible heating sheets both from front or rear of body, the heat is more balanced, and a warmth retention effect is better. The plurality of the flexible heating sheets are bendable, that is, the plurality of the flexible heating sheets are flexible and bendable, which may better match with the clothing main body to fit the users and further avoids foreign body sensation.

BRIEF DESCRIPTION OF DRAWINGS

In order to more clearly illustrate technical solutions in embodiments of the present disclosure, accompanying drawings that need to be used in description of the embodiments are briefly described below. Obviously, the accompanying drawings in the following description are merely some embodiments of the present disclosure, and for those who skilled in the art, other drawings may be obtained according to these drawings without involving any inventive effort.

For a more complete understanding of the present disclosure and beneficial effects thereof, the following description is made in conjunction with the accompanying drawings, in which same reference numeral refer to same part in the following description.

Figure 1:
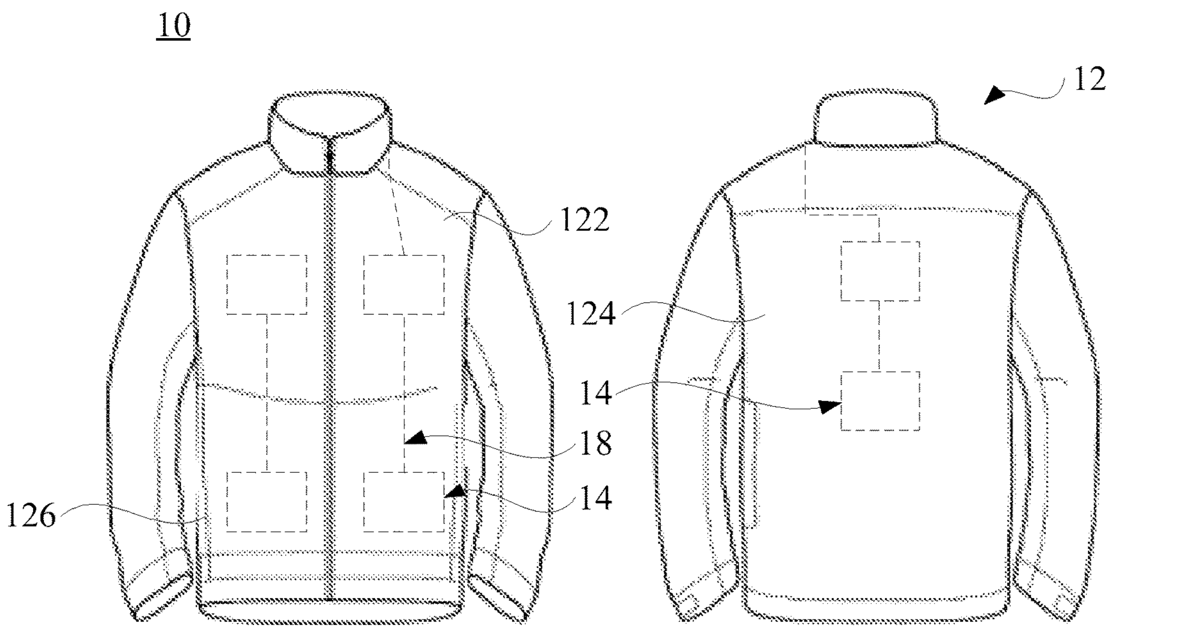
FIG. 1 is a schematic diagram of a heated clothing in a first structure according to one embodiment of the present disclosure.

Reference numerals in the drawings: 10. heated clothing; 12. clothing main body; 122. front portion; 124. rear portion; 125. front side; 1252. heat insulation layer; 126. pocket; 127. rear side; 1272. first heat conduction layer; 1274. second heat conduction layer; 128. inner layer; 14. flexible heating sheet; 142. first flexible heating sheet; 144. second flexible heating sheet; 15. flexible heat conduction sheet; 16. flexible waterproof sleeve; 17. temperature sensor; 18. power supply line; 181. connecting line; 182. power supply interface; 183. control button; 1832. increase button; 1834. decrease button; 184. communication unit; 185. first line; 1852. first adjusting circuit; 186. second line; 1862. second adjusting circuit.

DETAILED DESCRIPTION

Technical solutions in embodiments of the present disclosure are clearly and completely described below with reference to accompanying drawings in the embodiments of the present disclosure. Obviously, described embodiments are only a part of the embodiments of the present disclosure, but are not all embodiments. All other embodiments obtained by those who skilled in the art based on the embodiments of the present disclosure without creative efforts shall fall within protection scopes of the present disclosure.

Referring to FIG. 1, FIG. 1 is a schematic diagram of a heated clothing in a first structure according to one embodiment of the present disclosure. The embodiments of the present disclosure provide the heated clothing 10. The heated clothing 10 includes a clothing main body 12, a plurality of flexible heating sheets 14, and a power supply line 18. The clothing main body 12 is configured to wear on users, and styles, materials, etc. of the clothing main body 12 are various and may be set according to different requirements. For example, the clothing main body 12 may be a sweater, a hoodie, a down jacket, a jacket, an interchange jacket, a vest, etc., and the materials of the clothing main body 12 may be one or more materials of cotton fiber, polyester, pure cotton, genuine leather, poly urethane (PU) leather, polyester fiber, etc. The clothing main body 12 may be an upper wear or a lower wear, such as trousers. The clothing main body 12 includes a front portion 122 and a rear portion 124, the front portion is disposed opposite to the rear portion 124, after the clothing main body 12 is worn on a user, the front portion 122 of the clothing main body 12 is located in front of the user, and the rear portion 124 of the clothing main body 12 is located behind the user.

The plurality of the flexible heating sheets 14 are disposed at intervals on the clothing main body 12, a first part of the plurality of the flexible heating sheets 14 are disposed at the front portion 122, and a second part of the plurality of the flexible heating sheets 14 are disposed at the rear portion 124, and each of the plurality of the flexible heating sheets 14 is bendable.

The power supply line 18 is electrically connected to each of the plurality of the flexible heating sheets 14 to supply power to each of the plurality of the flexible heating sheets 14, so that each of the plurality of the flexible heating sheets 14 is capable of generating heat to provide to the user.

The plurality of the flexible heating sheets 14 are distributed at the front portion 122 and the rear portion 124, so that the user may feel heat provided by the plurality of the flexible heating sheets 14 both from front or rear of body, for example, multiple portions in chest, abdomen, back, arm, shoulder, and back waist of the user may feel the heat provided by the plurality of the flexible heating sheets 14, the heat is more balanced, and a warmth retention effect is better. The plurality of the flexible heating sheets 14 are bendable, that is, the plurality of the flexible heating sheets 14 are flexible and bendable, which may better match with the clothing main body 12 to fit the user and further avoids foreign body sensation. For example, the plurality of the flexible heating sheets 14 may be bent along with bending of the clothing main body 12, so that forming hard bumps or sharp corners is avoided and the user may not be affected.

Each of the plurality of the flexible heating sheets 14 may include a nano-carbon composite thin film material, a carbon fiber material, graphene, a carbon nanotube, or other conductive materials. A heating principle of the plurality of the flexible heating sheets 14 is based on the Joule's law, that is, when current passes through a conductive layer, heat is generated, and magnitude of the heat is directly proportional to magnitude of the current and resistance of the conductive layer.

In some embodiments, a number of the first part of the plurality of the flexible heating sheets 14 is greater than a number of the second part of the plurality of the flexible heating sheets 14. For example, three flexible heating sheets 14 in the plurality of the flexible heating sheets 14 are disposed at the front portion 122, two flexible heating sheets 14 in the plurality of the flexible heating sheets 14 are disposed at the rear portion 124. For another example, four flexible heating sheets 14 in the plurality of the flexible heating sheets 14 are disposed at the front portion 122, three flexible heating sheets 14 are disposed at the rear portion 124. It can be understood that the number of the first part of the plurality of the flexible heating sheets 14 disposed at the front portion 122 and the number of the second part of the plurality of the flexible heating sheets 14 disposed at the rear portion 124 may be set according to requirements. Considering that feeling of the user on the front of the body is more obvious than feeling of the user on the rear of the body, the number of the first part of the plurality of the flexible heating sheets 14 disposed at the front portion 122 is greater than the number of the plurality of the flexible heating sheets 14 disposed at the rear portion 124.

A position of the first part of the plurality of the flexible heating sheets 14 disposed at the front portion 122 may be set according to requirements. For example, the four flexible heating sheets 14 in the plurality of the flexible heating sheets 14 disposed at the front portion 122 may be set corresponding to a left front chest, a right front chest, a left abdomen, and a right abdomen of the user. A position of the second part of the plurality of the flexible heating sheets 14 disposed at the rear portion 124 may be set according to requirements. For example, one flexible heating sheets in the plurality of the flexible heating sheets 14 disposed at the rear portion 124 may be set according to the back of the user.

Figure 2:
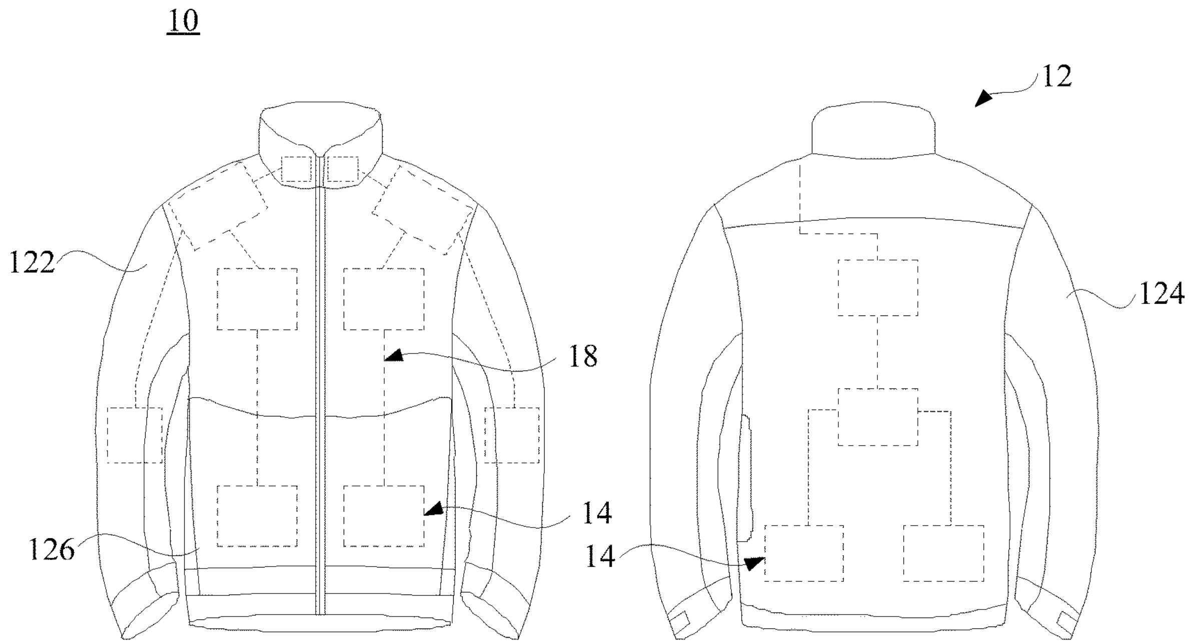
FIG. 2 is a schematic diagram of the heated clothing in a second structure according to one embodiment of the present disclosure.

In some embodiments, the clothing main body 12 includes five flexible heating sheets 14. Four flexible heating sheets 14 in the five flexible heating sheets 14 are set corresponding to the left front chest, the right front chest, the left abdomen, and the right abdomen of the user, where positions of the left abdomen and the right abdomen of the user may also be positions of a left pocket 126 and a right pocket 126 of the clothing main body 12, and one flexible heating sheet 14 in the five flexible heating sheets 14 is set corresponding to the back of the user. In some other embodiments, the clothing main body 12 includes six flexible heating sheets 14, four flexible heating sheets 14 in the six flexible heating sheets 14 are set corresponding to the left front chest, the right front chest, the left abdomen, and the right abdomen of the user, and two flexible heating sheets 14 in the six flexible heating sheets 14 are set corresponding to the back and the back waist of the user. In some embodiments, please refer to FIG. 2, FIG. 2 is a schematic diagram of the heated clothing in a second structure according to one embodiment of the present disclosure, the clothing main body 12 includes thirteen flexible heating sheets 14, nine flexible heating sheets 14 in the thirteen flexible heating sheets 14 are disposed at the front portion 122 of the clothing main body 12, where first two flexible heating sheets 14 are set corresponding to a left shoulder and a right shoulder of the user, second two flexible heating sheets 14 are set corresponding to a left arm and a right arm of the user, third two flexible heating sheets 14 are set corresponding to the left front chest and the right front chest of the user, fourth two flexible heating sheets 14 are set corresponding to the left abdomen and the right abdomen of the user, and one flexible heating sheet 14 is set corresponding to a neck of the user; four flexible heating sheets 14 in the thirteen flexible heating sheets 14 are disposed at the rear portion 124 of the clothing main body 12, where first two flexible heating sheets 14 are set corresponding to a left back waist and a right back waist of the user, and second two flexible heating sheets 14 are set corresponding to the back of the user.

In some embodiments, the plurality of the flexible heating sheets 14 extend from the front portion 122 of the clothing main body 12 to the rear portion 124 of the clothing main body 12; if the plurality of the flexible heating sheets 14 are disposed corresponding to a shoulder portion of the user, the plurality of the flexible heating sheets 14 extend from the front portion 122 of the clothing main body 12 to the rear portion 124 of the clothing main body 12; and if the plurality of the flexible heating sheets 14 are disposed corresponding to an arm portion of the user, the plurality of the flexible heating sheets 14 extend from the front portion 122 of the clothing main body 12 to the rear portion 124 of the clothing main body 12.

Certainly, in some other embodiments, considering requirements of other users, the number of the first part of the plurality of the flexible heating sheets 14 disposed at the front portion 122 may be equal to or less than the number of the second part of the plurality of the flexible heating sheets 14 disposed at the rear portion 124.

Figure 3:
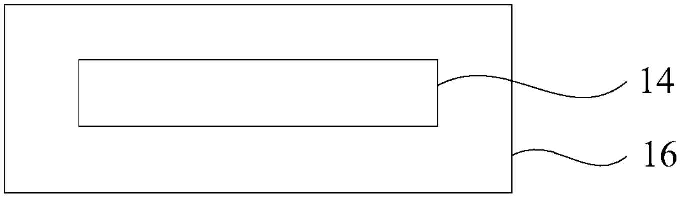
FIG. 3 is a structural schematic diagram of one of flexible heating sheets and one of flexible waterproof sleeves according to one embodiment of the present disclosure.

Please refer to FIG. 3, FIG. 3 is a structural schematic diagram of one of the plurality of the flexible heating sheets and one of flexible waterproof sleeves according to one embodiment of the present disclosure. In some embodiments, the heated clothing 10 further includes a plurality of flexible waterproof sleeves 16, each of the plurality of the flexible heating sheets 14 is sleeved by one of the plurality of the flexible waterproof sleeves 16. When the user wears the heated clothing 10 on rainy days, some of rainwater may permeate into the heated clothing 10, and the plurality of the flexible heating sheets 14 are electrically heated devices, which may be easily damaged by the rainwater. In the embodiment, each of the plurality of the flexible waterproof sleeves 16 is sleeved on a corresponding one of the plurality of the flexible heating sheets 14 for protection, thereby achieving a waterproof effect. Each of the plurality of the flexible waterproof sleeves 16 integrally covers the corresponding one of the plurality of the flexible heating sheets 14, and a connection between each of the plurality of the flexible waterproof sleeves 16 and the power supply line 18 is also hermetically connected by each of the plurality of the flexible waterproof sleeves 16, thereby achieving overall waterproof sealing of the corresponding one of the plurality of the flexible heating sheets 14. For example, each of the plurality of the flexible waterproof sleeves 16 is first sleeved on the corresponding one of the plurality of the flexible heating sheets 14, and then an opening of each of the plurality of the flexible waterproof sleeve 16 is sealed by hot melting or other modes, so that a whole body of each of the plurality of flexible heating sheets 14 is sealed. The plurality of the flexible waterproof sleeves 16 sleeved on the plurality of the flexible heating sheets 14 may also be subjected to hot blowing, so that each of the plurality of the flexible waterproof sleeves 16 contracts and is in close contact with the corresponding one of the plurality of the flexible heating sheets 14.

It should be noted that the plurality of the flexible waterproof sleeves 16 are not only waterproof, and materials of the plurality of the flexible waterproof sleeves are also made of heat conduction materials, so that the plurality of the flexible waterproof sleeves 16 do not affect heat generated by the plurality of the flexible heating sheets 14 to be transferred to the user.

Figure 4:
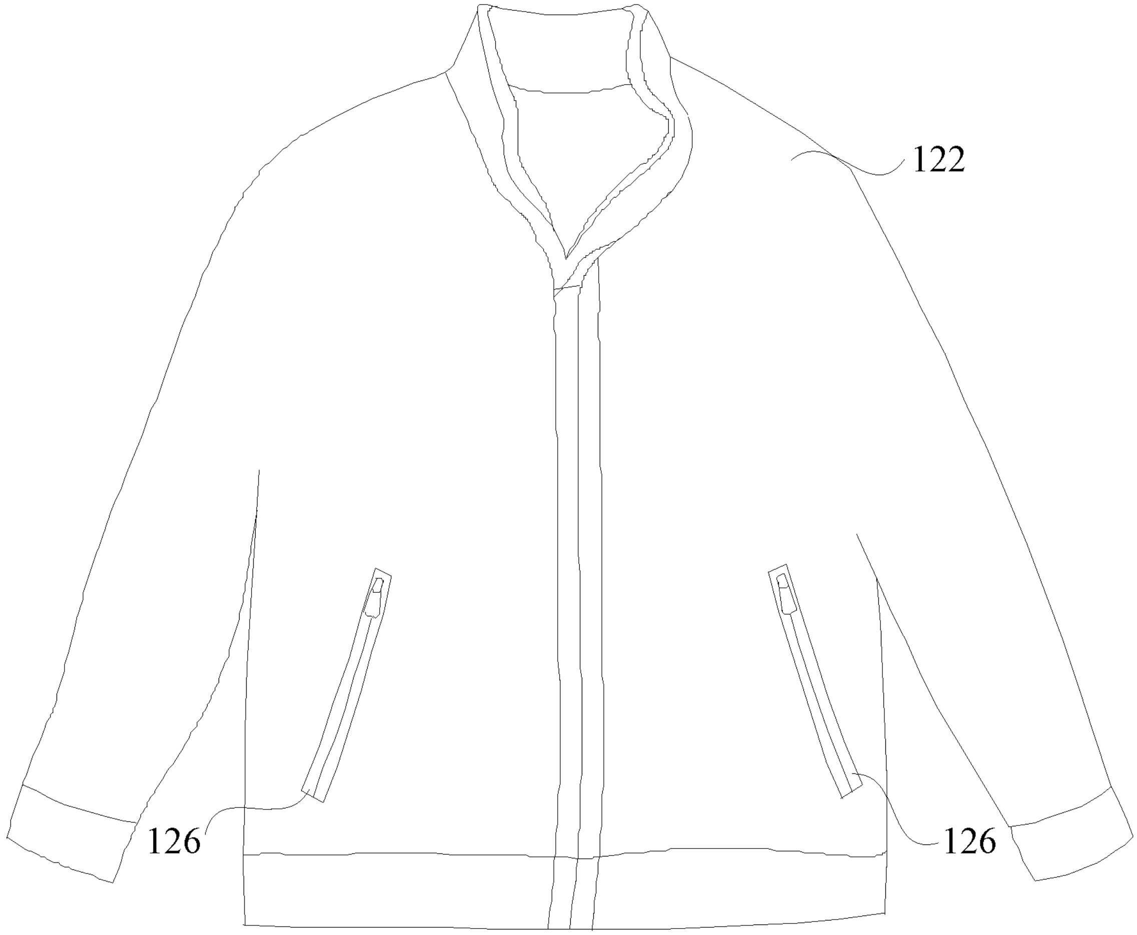
FIG. 4 is a schematic diagram of the heated clothing in a third structure according to one embodiment of the present disclosure.
Figure 5:
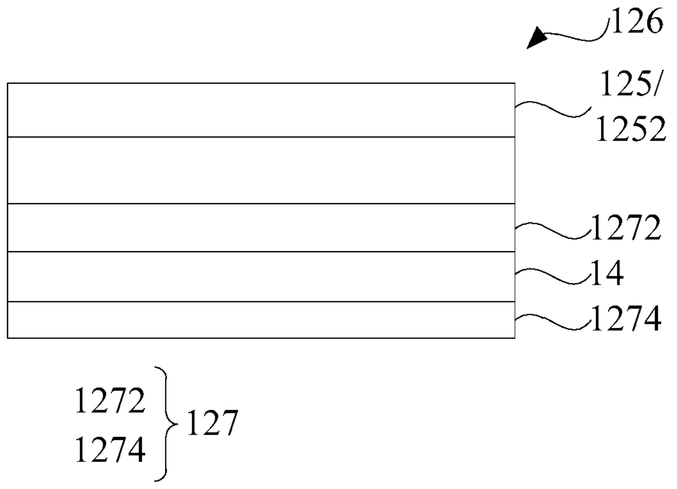
FIG. 5 is a schematic diagram of one of pockets and one of the flexible heating sheets, being in a first structure, according to one embodiment of the present disclosure.

Please refer to FIGS. 4-5, FIG. 4 is a schematic diagram of the heated clothing in a third structure according to one embodiment of the present disclosure, and FIG. 5 is a schematic diagram of one of pockets and one of the flexible heating sheets, being in a first structure, according to one embodiment of the present disclosure. In some embodiments, pockets 126 are disposed on the front portion 122. The front portion 122 includes a front side 125 and a rear side 127, the front side 125 and the rear side 127 form each of the pockets 126, the front side 125 includes a heat insulation layer 1252, the rear side 127 includes a first heat conduction layer 1272 and a second heat conduction layer 1274, and one of the plurality of flexible heating sheets 14 is disposed between the first heat conduction layer 1272 and the second heat conduction layer 1274.

The one of the plurality of the flexible heating sheets 14 is disposed in the rear side 127 forming each of the pockets 126, the first heat conduction layer 1272 and the second heat conduction layer 1274 are respectively disposed at two sides of the one of the plurality of the flexible heating sheets 14, the first heat conduction layer 1272 and the second heat conduction layer 1274 are capable of respectively conducting the heat generated by the one of the plurality of the flexible heating sheets 14 to the abdomen of the body of the user or a corresponding one of the pockets 126. The front side 125 forming each of the pockets 126 includes the heat insulation layer 1252, which is capable of preventing heat in each of the pockets 126 from heat loss, thereby forming a warm space within each of the pockets 126, and hands of the user being placed into the pockets 126 may be better kept warm to achieve a better warmth retention effect. Considering that hands of the user may be exposed outside of the clothing main body 12 and are often required to perform operations, the warm space within each of the pockets 126 may warm the hands of the user at any time. In addition, the warm space within each of the pockets 126 may also preserve heat of items placed in each of the pockets 126, such as milk, bread, gloves, etc., so as to meet daily use requirements of the user.

Certainly, in some other embodiments, the pockets 126 may also be disposed at the rear portion 124. Structures of the pockets 126 and the flexible heating sheets 14 may refer to above embodiment, and details are not described herein again.

Figure 6:
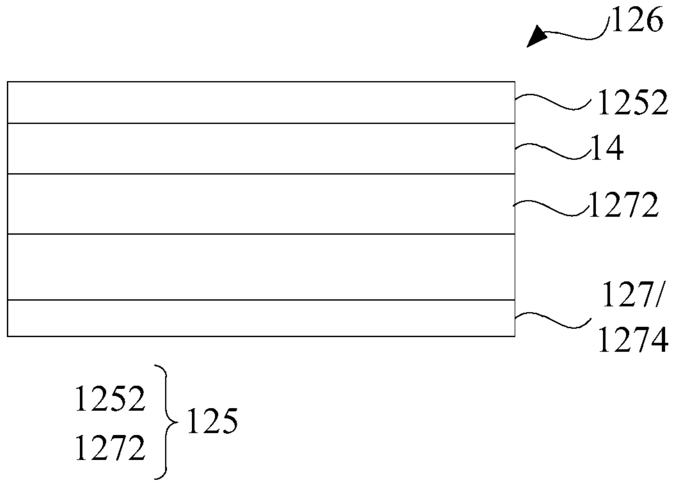
FIG. 6 is schematic diagram of one of the pockets and one of the flexible heating sheets, being in a second structure, according to one embodiment of the present disclosure.

Please refer to FIG. 6, FIG. 6 is schematic diagram of one of the pockets and one of the flexible heating sheets, being in a second structure, according to one embodiment of the present disclosure. In some embodiments, pockets 126 are disposed on the front portion 122. The front portion 122 includes a front side 125 and a rear side 127, the front side 125 and the rear side 127 form each of the pockets 126, the front side 125 includes a heat insulation layer 1252 and a first heat conduction layer 1272, the rear side 127 includes a second heat conduction layer 1274, and one of the plurality of flexible heating sheets 14 is disposed between the heat insulation layer 1252 and the first heat conduction layer 1272.

The one of the plurality of the flexible heating sheets 14 is disposed in the front side 125 forming each of the pockets 126, the heat insulation layer 1252 and the first heat conduction layer 1272 are respectively disposed at two sides of the one of the plurality of the flexible heating sheets 14, and the rear side 127 forming each of the pockets 126 includes the second heat conduction layer 1274. The first heat conduction layer 1272 is capable of conducting the heat generated by the one of the plurality of the flexible heating sheets 14 to each of the pockets 126, the second heat conduction layer 1274 is capable of conducting the heat in each of the pockets 126 to the abdomen of the body of the user. The heat insulation layer 1252 may prevent heat in each of the pockets 126 from heat loss, thereby forming a warm space within each of the pockets 126, and hands of the user being placed into the pockets 126 may be better kept warm to achieve a better warmth retention effect. In addition, the warm space within each of the pockets 126 may also preserve heat of items placed in each of the pockets 126.

Figure 7:
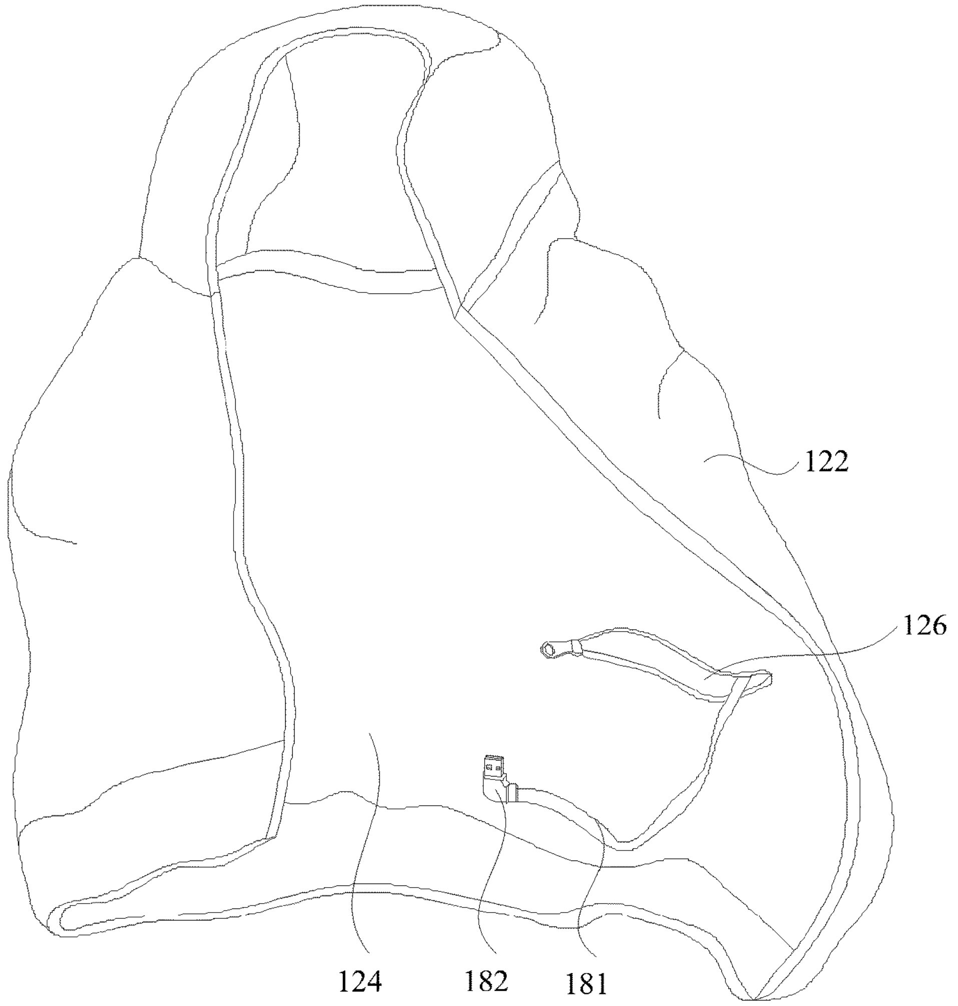
FIG. 7 is a schematic diagram of the heated clothing in a fourth structure according to one embodiment of the present disclosure.

It can be understood that positions of the pockets may be set according to requirements. In some embodiments, the pockets 126 may be disposed at an outer side of the clothing main body 12, such as an outer side of the front portion 122 or the rear portion 124 of the clothing main body 12. In some other embodiments, please refer to FIG. 7, FIG. 7 is a schematic diagram of the heated clothing in a fourth structure according to one embodiment of the present disclosure, the pockets 126 may be disposed at an inner side of the clothing main body 12, such as an inner side of the front portion 122 or the rear portion 124 of the clothing main body 12.

Figure 8:
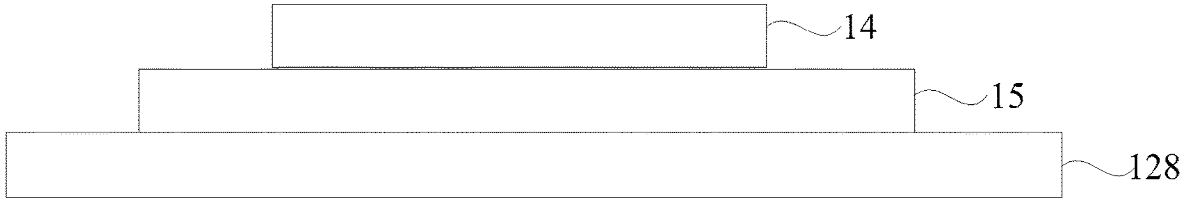
FIG. 8 is a structural schematic diagram of one of the flexible heating sheets and one of flexible heat conduction sheets according to one embodiment of the present disclosure.

Please refer to FIG. 8, FIG. 8 is a structural schematic diagram of one of the plurality of the flexible heating sheets and one of flexible heat conduction sheets according to one embodiment of the present disclosure. In some embodiments, the clothing main body 12 includes an inner layer 128, and the inner layer 128 is one layer of the clothing main body 12 facing the body of the user, and the heated clothing 10 further includes flexible heat conduction sheets 15, the flexible heat conduction sheets 15 are disposed between the plurality of the flexible heating sheets 14 and the inner layer 128, and an area of each of the flexible heat conduction sheets 15 is greater than an area of each of the plurality of the flexible heating sheets 14. The area of each of the plurality of the flexible heating sheets 14 is not large, and the heat generated by the plurality of the flexible heating sheets is relatively concentrated, the area of each of the flexible heat conduction sheets 15 is greater than the area of each of the plurality of the flexible heating sheets 14, and the heat generated by the plurality of the flexible heating sheets 14 which is relatively concentrated may be diffused. For example, heat at an area of one of the plurality of the flexible heating sheets 14 which is too high is diffused, so that a heat source having a more appropriate temperature and a larger area is provided, and a situation that partial areas of the one of the plurality of the flexible heating sheets are too high in temperature is avoided.

Figure 9:
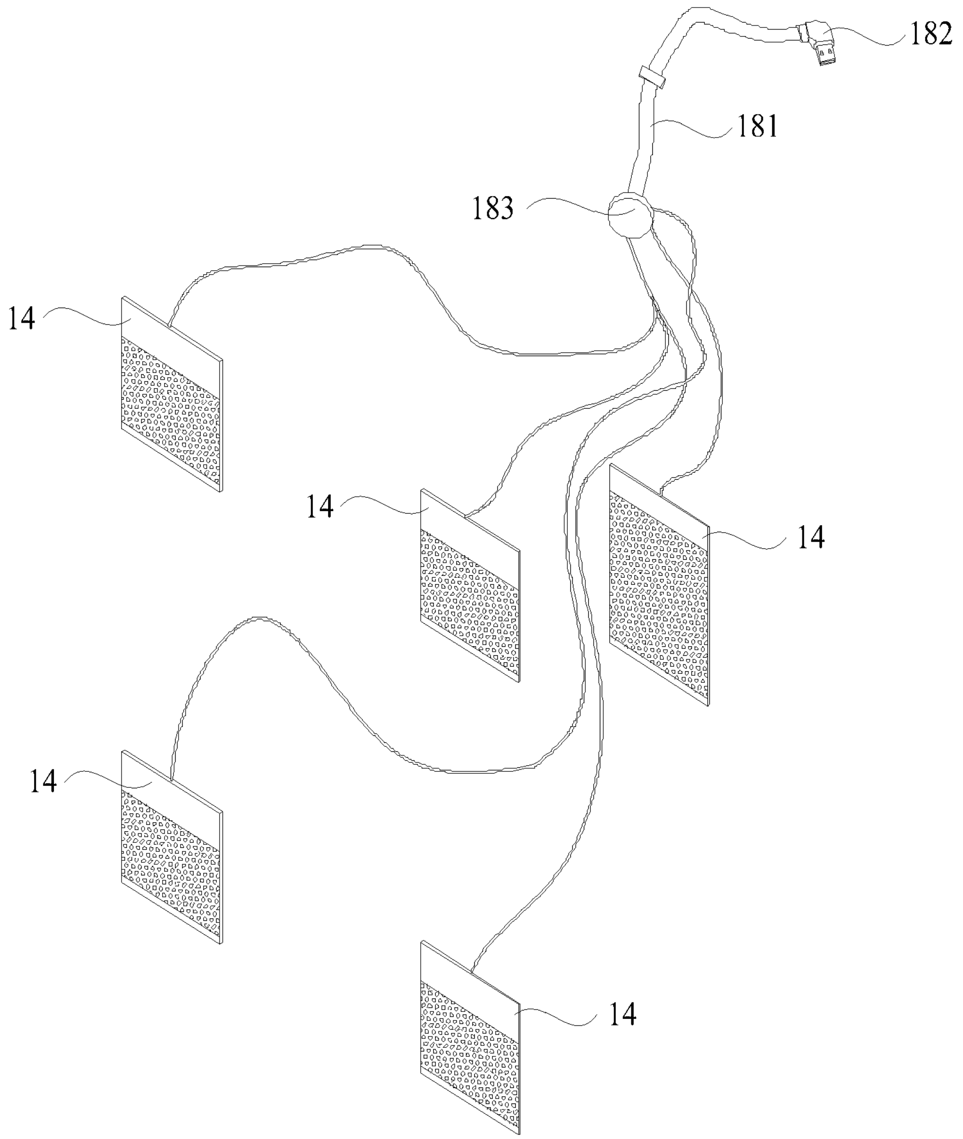
FIG. 9 is a schematic diagram of a power supply line and the flexible heating sheets, being in a first structure, according to one embodiment of the present disclosure.
Figure 10:
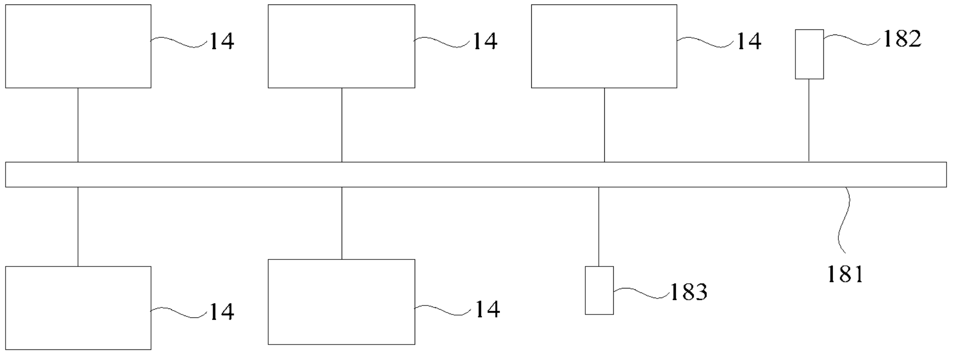
FIG. 10 is a schematic diagram of the power supply line and the flexible heating sheets, being in a second structure, according to one embodiment of the present disclosure.

Please refer to FIGS. 9-10, FIG. 9 is a schematic diagram of a power supply line and the plurality of the flexible heating sheets, being in a first structure, according to one embodiment of the present disclosure, and FIG. 10 is a schematic diagram of the power supply line and the plurality of the flexible heating sheets, being in a second structure, according to one embodiment of the present disclosure. In some embodiments, the power supply line 18 includes a connecting line 181, power supply interfaces 182, and a control button 183. The connecting line 181 is electrically connected to each of the plurality of the flexible heating sheets 14, the power supply interfaces 182 are connected to the connecting line 181 to supply the power to each of the plurality of the flexible heating sheets 14, and the control button 183 is connected to the connecting line 081 to control each of the plurality of the flexible heating sheets 14 to be connected or disconnected.

The control button 183 is capable of being operated by the user, so as to control each of the plurality of the flexible heating sheets 14 to be heated or stop heating. Types of the control button 183 may be set according to requirements. For example, the control button 183 may be a press-type button, and each of the plurality of the flexible heating sheets 14 is controlled to be connected or disconnected through pressing the control button 183; the control button 183 may also be a touch-control button, and each of the plurality of the flexible heating sheets 14 is controlled to be connected or disconnected through touching the control button 183; the control button 183 may also be other types of buttons, such as a knob-type button and a toggle-type button.

A number of the control button 183 may be one, and the one control button 183 controls all of the plurality of the flexible heating sheets 14 to be connected or disconnected. Certainly, the plurality of the flexible heating sheets 14 may also be controlled in other modes. Exemplarily, all of the plurality of the flexible heating sheets 14 may be controlled by an external device. For example, the external device controls all of the plurality of the flexible heating sheets 14 to be connected or disconnected through wireless communication or wired communication. There may be a plurality of control buttons 183, the plurality of the control buttons 183 control the plurality of the flexible heating sheets 14. In some embodiments, each of the plurality of the control buttons 183 controls a corresponding one of the plurality of the flexible heating sheets 14. In some embodiments, two control buttons 183 control all of the plurality of the flexible heating sheets 14, for example, a first one of the two control buttons 183 controls the first part of the plurality of the flexible heating sheets 14 disposed at the front portion 122, and a second one of the two control buttons 183 controls the second part of the plurality of the flexible heating sheets 14 disposed at the rear portion 124. Certainly, other control modes may also be adopted. For example, a first one control button 183 controls flexible heating sheets 14 located at the left front chest and the right front chest of the user, a second one control button 183 controls flexible heating sheets 14 located at the left front abdomen and the right front abdomen of the user, and a third one control button 183 controls flexible heating sheets 14 located at the back of the user.

A battery may be disposed in the heated clothing 10, and the battery is connected to the plurality of the flexible heating sheets 14 through the power supply line 18, that is, the battery supplies power to the plurality of the flexible heating sheets 14.

The battery may also be not required to be disposed in the heated clothing 10, the power supply interfaces 182 of the power supply line 19 is connected to an external power supply, so as to supply power to the plurality of the flexible heating sheets 14.

In some embodiments, the power supply interfaces 182 are disposed corresponding to the pockets 126 disposed at the front portion 122. The power supply interfaces are disposed corresponding to the pockets 126, which is convenient for the user to find the power supply interfaces, and the pockets 126 are also convenient for accommodating power supply devices.

In some embodiments, the power supply interfaces 182 are disposed in the pockets 126, the pockets 126 are configured to accommodate the power supply devices, and the power supply interfaces 182 are configured to plug into the power supply devices. The power supply devices may be mobile power supplies, the mobile power supplies may be placed in the pockets 126, the user does not need to hold the mobile power supplies by hands, and there is no need to additionally provide a structure for accommodating the mobile power supplies, which is convenient for the mobile power supplies to supply the power to the plurality of the flexible heating sheets 14. The power supply interfaces 182 may be universal serial bus (USB) interfaces or other interfaces. The power supply devices may also be adapters, etc., and the power supply interfaces 182 are disposed in the pockets 126, so as to be hidden in the pocket 126 when not being in use, which is not easily damaged, and does not affect appearance of the heated clothing 10.

In some embodiments, the front portion 122 includes a front side 125 and a rear side 127, the front side 125 and the rear side 127 form each of the pockets 126, each of the power supply interfaces 182 includes a wireless charging coil, the wireless charging coil is disposed in the rear side 127, and the wireless charging coil is configured to wirelessly cooperate with a wireless transmitting coil of an external device for supplying power to each of the plurality of the flexible heating sheets 14. The power supply interfaces 182 may also be connected to the external device for wirelessly supplying power. The wireless transmission coil of the external device and the wireless charging coil of each of the power supply interfaces 182 perform wireless energy transmission without providing an exposed interface, thereby further improving integrity of the clothing main body 12, and also improving waterproof performance of the power supply interfaces 182.

In some embodiments, each of the power supply interfaces further includes a first magnetic component, the first magnetic component is disposed adjacent to the wireless charging coil, the first magnetic component is configured to magnetically connected to a second magnetic component of the external device, so as to align the wireless charging coil with the wireless transmitting coil. The wireless charging coil and the wireless transmitting coil need to be aligned for wireless energy transmission, and the first magnetic component and the second magnetic component are magnetically connected, so that the power supply interfaces each corresponds to an area where the external device is fixed, so that the wireless charging coil is aligned with the wireless transmitting coil, so that the wireless charging coil and the wireless transmitting coil have higher energy transmission efficiency.

Each of the first magnetic component and the second magnetic component may be a magnet, or one of the first magnetic component and the second magnetic component may be a magnetic metal.

Figure 11:
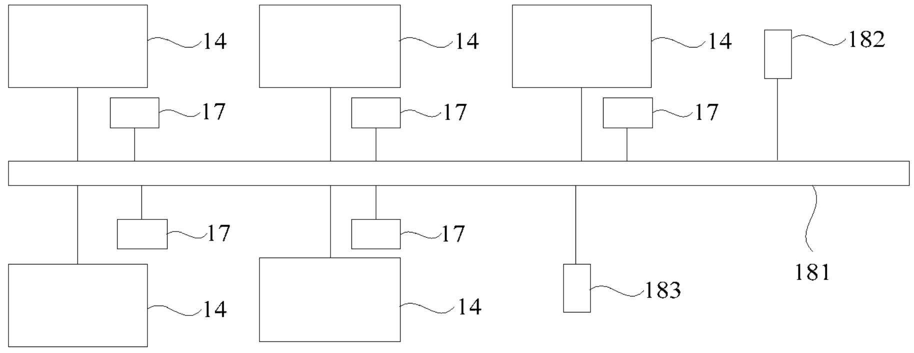
FIG. 11 is a structural schematic diagram of the power supply line, the flexible heating sheets, and temperature sensors according to one embodiment of the present disclosure.

Please refer to FIG. 11, FIG. 11 is a structural schematic diagram of the power supply line, the plurality of the flexible heating sheets, and temperature sensors according to one embodiment of the present disclosure.

In some embodiments, the heated clothing 10 further includes a plurality of temperature sensors 17, at least one of the plurality of the temperature sensors 17 is disposed on each of the plurality of the flexible heating sheets 14, and when a temperature collected by any one of the plurality of the temperature sensors 17 exceeds a temperature threshold, a corresponding one of the plurality of the flexible heating sheets 14 is controlled to stop heating.

During a process of providing heat to the user of the plurality of the flexible heating sheets 14, a temperature of each of the plurality of the flexible heating sheets 14 may continuously rise. The plurality of the flexible heating sheets 14 are controlled to be connected or disconnected by monitoring the temperature of each of the plurality of the flexible heating sheets 14. For example, at least one of the plurality of the temperature sensors 17 is disposed on each of the plurality of the flexible heating sheets 14, and when temperature collected by any one of the plurality of the temperature sensors 17 exceeds the temperature threshold, a temperature of a corresponding one of the plurality of the flexible heating sheets 14 is too high, then the corresponding one of the plurality of the flexible heating sheets 14 is controlled to stop heating, which prevents the user from being scalded by the corresponding one of the plurality of the flexible heating sheets 14 having too high temperature, and further prevents the plurality of the flexible heating sheets 14 from being damaged due to too high temperature.

The plurality of the temperature sensors 17 may be disposed on the plurality of the flexible heating sheets 14, or may be disposed adjacent to the plurality of the flexible heating sheets 14. The temperature threshold may be set according to requirements, such as 40 degrees, 45 degrees, or 50 degrees, etc.

It can be understood that after the plurality of the flexible heating sheets 14 stop heating, the temperature of each of the plurality of the flexible heating sheets 14 is continuously monitored, and when the temperatures of plurality of the flexible heating sheets 14 are lower than second temperature thresholds, the plurality of the flexible heating sheets 14 are connected to re-heat. The second temperature thresholds are less than the temperature threshold, and the second temperature thresholds may also be set according to requirements, such as 42 degrees, 40 degrees, or 38 degrees. The second temperature thresholds corresponding to the plurality of the flexible heating sheets 14 may be the same or different.

Figure 12:
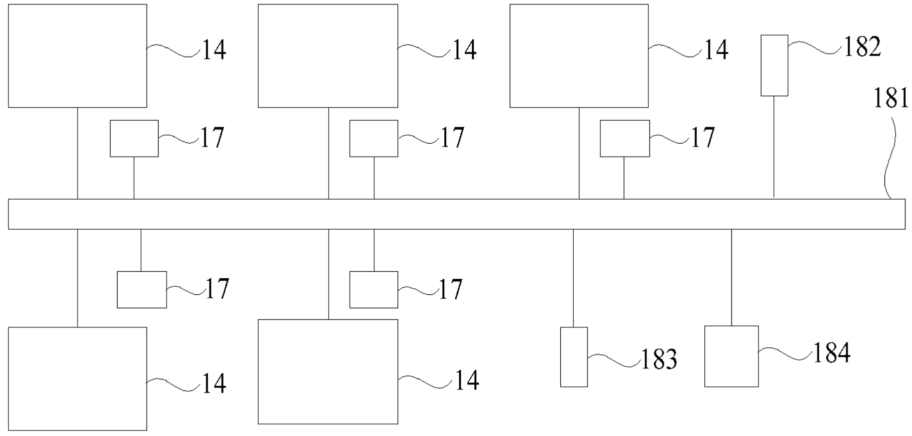
FIG. 12 is a structural schematic diagram of the power supply line and related devices, being in a first structure, according to one embodiment of the present disclosure.

Please refer to FIG. 12, FIG. 12 is a structural schematic diagram of the power supply line and related devices, being in a first structure, according to one embodiment of the present disclosure, the heated clothing 10 further includes a plurality of temperature sensors 17 and a communication unit 184. At least one of the plurality of the temperature sensors 17 is disposed on each of the plurality of the flexible heating sheets 14, and each of the plurality of the temperature sensors 17 is configured to collect temperature information. The communication unit 184 is electrically connected to the plurality of the temperature sensors 17 and is configured to transmit the temperature information to an external device.

The communication unit 184 may transmit the temperature information collected by the plurality of the temperature sensors 17 to the external device, so as to obtain a temperature of each of the plurality of the flexible heating sheets 14, so that the user may monitor the temperature of each of the plurality of the flexible heating sheets 14 in real time.

In some embodiments, after obtaining the temperature of each of the plurality of the flexible heating sheets 14, the user may manually control a working state of each of the plurality of the flexible heating sheets 14. For example, one or more flexible heating sheets 14 having higher temperatures are stopped from being heated by the control button 183. For another example, one or more flexible heating sheets 14 having lower temperatures are connected to re-heat by the control button 183.

In some embodiments, after obtaining the temperature of each of the flexible heating sheets 14, the external device may control the working state of each of the plurality of the flexible heating sheets 14. For example, a control instruction is transmitted through the communication unit 184 to stop heating the one or more flexible heating sheets 14 having the higher temperatures. For another example, a control instruction is transmitted through the communication unit 184 to connect the one or more flexible heating sheets 14 having the lower temperature to re-heat. The communication unit 184 may be a wired communication interface, such as a USB communication interface, an inter-integrated circuit (IIC) communication interface, or other communication interfaces. The communication unit 184 may also be a wireless communication module, such as a Bluetooth communication module, a Wi-Fi communication module, or a near field communication (NFC) module. For example, an external device, such as a mobile phone, may use a Bluetooth communication technology or other communication technologies to control the working state of each of the plurality of the flexible heating sheets 14 through an installed application.

In some embodiments, the communication unit 184 is further configured to obtain a control instruction transmitted by the external device, at least one target heating sheet is selected from the plurality of the flexible heating sheets according to the control instruction, and the at least one target heating sheet is further controlled to stop heating or re-heating according to the control instruction. Each of the plurality of the flexible heating sheets 14 may be separately controlled, and the communication unit 184 may control each of the plurality of the flexible heating sheets 14 according to the control instruction of the external device, certainly, in other examples, the communication unit 184 may also control all the plurality of the flexible heating sheets 14 to be connected or disconnected at the same time according to the control instruction of the external device.

In some embodiments, the communication unit 184 is further configured to obtain a control instruction transmitted by the external device, and a temperature threshold corresponding to each of the plurality of the temperature sensors 17 is confirmed according to the control instruction; and when the temperature information exceeds the temperature threshold, a corresponding one of the plurality of the flexible heating sheets 14 is controlled to stop heating. The temperature threshold of each of the plurality of the temperature sensors 17 corresponding to each of the flexible heating sheets 14 is capable of being setting, for example, setting by the external device, such as the mobile phone. The temperature threshold may be increased or decreased according to requirements of different users. Thus, the plurality of the flexible heating sheets 14 may be heated to different temperature thresholds. For example, a temperature threshold corresponding to the first part of the plurality of the flexible heating sheets 14 disposed at the front portion 122 may be increased, and a temperature threshold corresponding to the second part of the plurality of the flexible heating sheets 14 disposed at the rear portion 124 may be maintained or decreased. In addition, the second temperature thresholds corresponding to the plurality of the flexible heating pieces 14 may also be set by the external device, that is, the second temperature thresholds for determining whether the plurality of the flexible heating sheets 14 need to be connected to re-heat may also be set by the external device. For example, the second temperature thresholds corresponding to the first part of the plurality of the flexible heating sheets 14 disposed at the front portion 122 may be decreased, and the second temperature thresholds corresponding to the second part of the plurality of the flexible heating sheets 14 disposed at the rear portion 124 may be maintained or increased.

Figure 13:
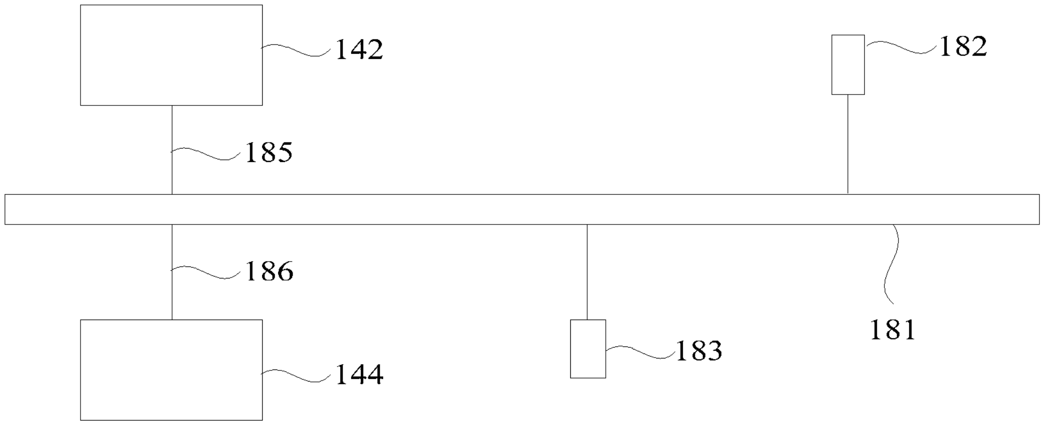
FIG. 13 is a structural schematic diagram of the power supply line and the related devices, being in a second structure, according to one embodiment of the present disclosure.

Please refer to FIG. 13, FIG. 13 is a structural schematic diagram of the power supply line and the related devices, being in a second structure, according to one embodiment of the present disclosure. In some embodiments, each of the plurality of the flexible heating sheets 41 includes first flexible heating sheets 142 and at least one second flexible heating sheet 144. The power supply line 18 includes a first line 185 and a second line 186, the first line 185 is electrically connected to the first flexible heating sheets 142, the second line 186 is electrically connected to the at least one second flexible heating sheet 144, and power transmitted by the first line 185 is different from power transmitted by the second line 186. The plurality of the flexible heating sheets 14 may be respectively controlled by different lines, so that the plurality of the flexible heating sheets 14 may respectively have different working powers. For example, working power of the first part of the plurality of the flexible heating sheets 14 disposed at the front portion 122 is greater than working power of the second part of the plurality of the flexible heating sheets 14 disposed at the rear portion 124. A temperature of the first part of the plurality of the flexible heating sheets 14 disposed at the front portion 122 is greater than a temperature of the second part of the plurality of the flexible heating sheets 14 disposed at the rear portion 124, so as to provide a targeted temperature for different body parts of the user, thereby improving user experience.

It should be noted that a number of the first flexible heating sheets 142 and the at least one second flexible heating sheet 144 may be set according to requirements. For example, there are two first flexible heating sheets 142, and the two first flexible heating sheets 142 are disposed corresponding to a left chest and a right chest of the user, there is one second flexible heating sheet 144, and the one second flexible heating sheet 144 is disposed corresponding to the back of the user. The plurality of the flexible heating sheets 14 are controlled together. For another example, the first flexible heating sheets 142 are the first part of the plurality of the flexible heating sheets 142 located at the front portion 122, and the at least one second flexible heating sheet 144 is the second part of the plurality of the flexible heating sheets 14 located at the rear portion 124.

It can be understood that each of the plurality of the flexible heating sheets 14 may be independently powered by one line. That is, each of the plurality of the flexible heating sheets 14 may independently control working power or temperatures, so as to meet temperature requirements of different body parts of different users. For example, when some users work, there is a shelter behind the user, but no shelter in front of the user, and therefore there is a need to provide a higher temperature for the first part of the plurality of the flexible heating sheets 14 disposed at the front portion 122. When some other users work, there is a shelter in front of the user, but no shelter behind the user, and therefore there a need to provide a higher temperature for the second part of the plurality of the flexible heating sheets 14 disposed at the rear portion 124. The plurality of the flexible heating sheets 14 at different positions in the embodiment may be respectively controlled to provide different temperatures.

Figure 14:
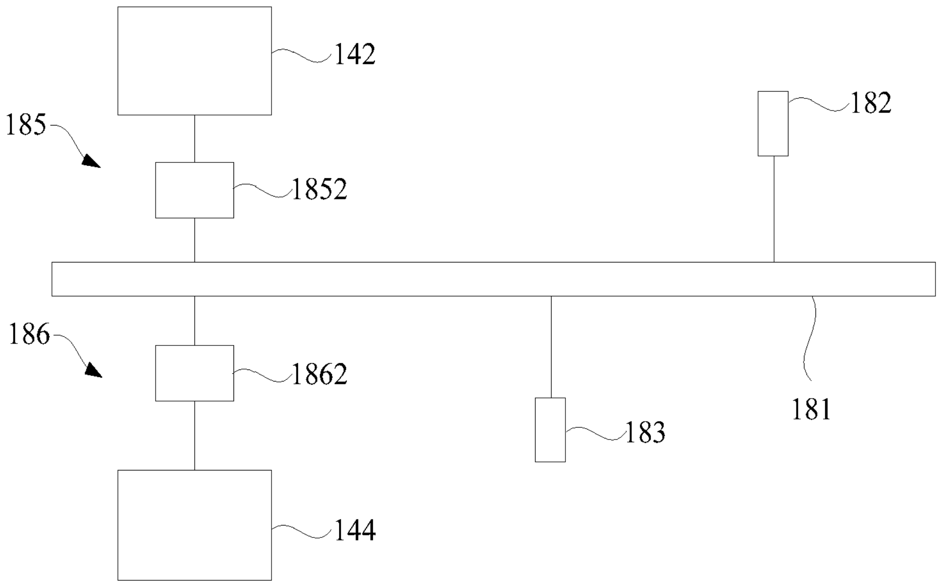
FIG. 14 is a structural schematic diagram of the power supply line and the related devices, being in a third structure, according to one embodiment of the present disclosure.

Please refer to FIG. 14, FIG. 14 is a structural schematic diagram of the power supply line and the related devices, being in a third structure, according to one embodiment of the present disclosure, in some embodiments, the first line 185 includes a first adjusting circuit 1852, the second line 186 includes a second adjusting circuit 1862, the first adjusting circuit 1852 is capable of adjusting working power of the first flexible heating sheets 142, and the second adjusting circuit 1862 is capable of adjusting working power of the at least one second flexible heating sheet 144. The first adjusting circuit 1852 is capable of adjusting the working power of the first flexible heating sheets 142, for example, the working power of the first flexible heating sheets 142 is adjusted by adjusting working currents and working voltages of the first flexible heating sheets 142. Similarly, the second adjusting circuit 1862 is capable of adjusting the working power of the at least one second flexible heating sheet 144, for example, the working power of the at least one second flexible heating sheet 144 is adjusted by adjusting working currents and working voltages of the at least one second flexible heating sheet 144. The first adjusting circuit 1852 and the second adjusting circuit 1862 may be controlled by buttons, for example, an increase button 1832 and a decrease button 1834 are disposed to cooperate with the first adjusting circuit 1852 and the second adjusting circuit 1862, so as to control the working power of the first flexible heating sheets 142 and the working power of the at least one second flexible heating sheet 144. For another example, the communication unit 184 cooperates with the first adjusting circuit 1852 and the second adjusting circuit 1862 to control the working power of the first flexible heating sheets 142 and the working power of the at least one second flexible heating sheet 144.

Figure 15:
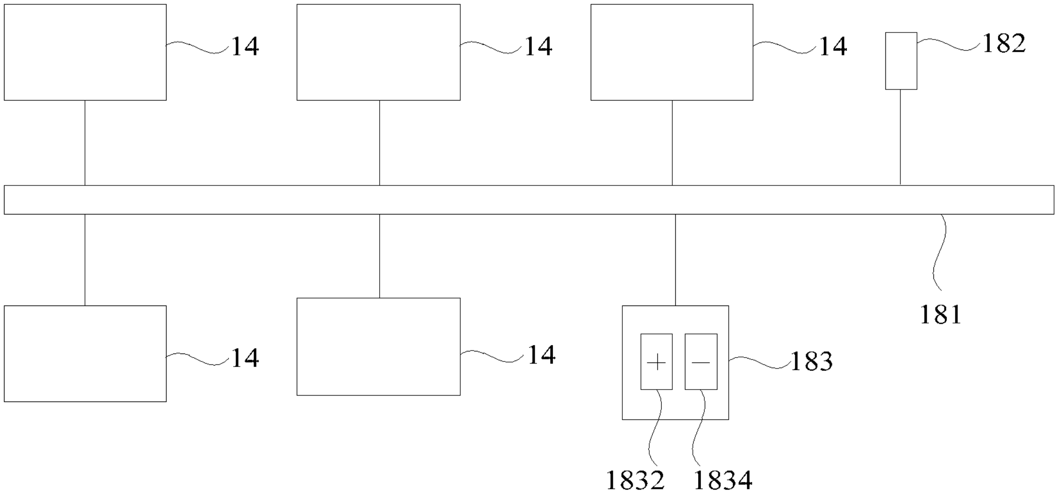
FIG. 15 is a structural schematic diagram of the power supply line and the related devices, being in a fourth structure, according to one embodiment of the present disclosure.

Please refer to FIG. 15, FIG. 15 is a structural schematic diagram of the power supply line and the related devices, being in a fourth structure, according to one embodiment of the present disclosure, the power supply line 18 includes an increase button 1832 and a decrease button 1834. When the increase button 1832 is triggered, working power of the plurality of the flexible heating sheets 14 is increased; and when the decrease button 1834 is triggered, working power of the plurality of the flexible heating sheets 14 is decreased. The increase button 1832 may simultaneously increase the working power of all of the plurality of the flexible heating sheets 14, and the decrease button 1834 may simultaneously decrease the operating power of all of the plurality of the flexible heating sheets 14. For example, all of the plurality of the flexible heating sheets 14 share one power control circuit, the increase button 1832 and the decrease button 1834 may control the one power control circuit to increase or decrease the working power of all of the plurality of the flexible heating sheets 14.

In some other embodiments, the power supply line may include a knob, the knob rotates in a first direction, such as a clockwise direction, the working power of the plurality of the flexible heating sheets may be increased; and the knob rotates in a second direction, such as a counterclockwise direction, the working power of the plurality of the flexible heating sheets may be decreased.

Figure 16:
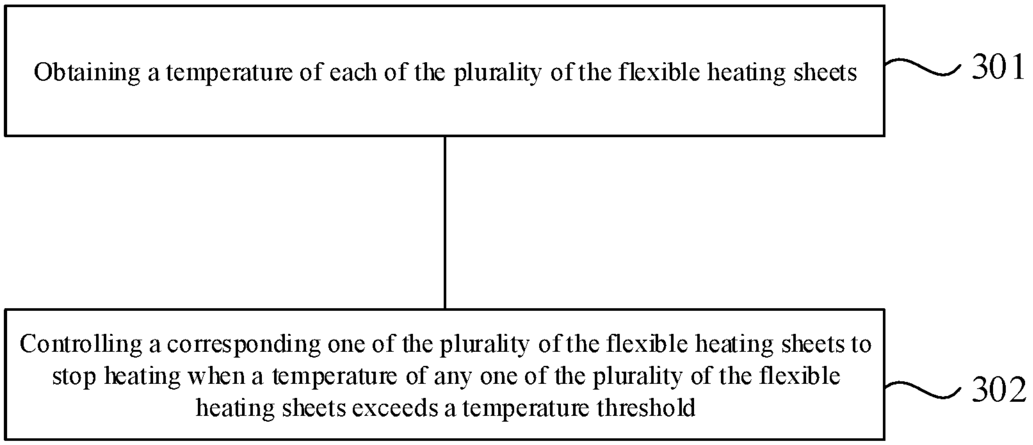
FIG. 16 is a flowchart of a control method of the heated clothing according to one embodiment of the present disclosure.

The present disclosure further provides a control method of the heated clothing as foregoing, and a structure of the heated clothing is not described herein again. Please refer to FIG. 16, FIG. 16 is a flowchart of the control method of the heated clothing according to one embodiment of the present disclosure. The control method of the heated clothing comprises following steps.

Step 301: obtaining a temperature of each of the plurality of the flexible heating sheets.

At least one of the plurality of the temperature sensors is correspondingly disposed on each of the plurality of the flexible heating sheets, and obtaining a temperature collected by the at least one of the plurality of the temperature sensors is equivalent to obtaining the temperature of each of the plurality of the flexible heating sheets.

The at least one of the plurality of the temperature sensors may be disposed on each of the plurality of the flexible heating sheets, or may be disposed adjacent to each of the plurality of the flexible heating sheets.

Step 302: controlling a corresponding one of the plurality of the flexible heating sheets to stop heating when a temperature of any one of the plurality of the flexible heating sheets exceeds a temperature threshold.

During the process of providing heat to the user of the plurality of the flexible heating sheets, the temperature of each of the plurality of the flexible heating sheets may continuously rise. The plurality of the flexible heating sheets are controlled to be connected or disconnected by monitoring the temperature of each of the plurality of the flexible heating sheets. For example, if the temperature of the corresponding one of the plurality of the flexible heating sheets exceeds the temperature threshold, the temperature of the corresponding one of the plurality of the flexible heating sheets is too high, then the corresponding one of the plurality of the flexible heating sheets is controlled to stop heating, which prevents the user from being scalded by the corresponding one of the plurality of the flexible heating sheets having too high temperature, and further prevents the plurality of the flexible heating sheets from being damaged due to too high temperature. The temperature threshold may be set according to requirements, such as 40 degrees, 45 degrees, or 50 degrees, etc.

It can be understood that after the plurality of the flexible heating sheets stop heating, the temperature of each of the plurality of the flexible heating sheets is continuously monitored, and when the temperatures of plurality of the flexible heating sheets are lower than the second temperature thresholds, the plurality of the flexible heating sheets 14 are connected to re-heat. The second temperature thresholds are less than the temperature threshold, and the second temperature thresholds may also be set according to requirements, such as 42 degrees, 40 degrees, or 38 degrees.

In some embodiments, the control method of the heated clothing further includes steps of obtaining an ambient temperature, and adjusting the temperature threshold according to the ambient temperature, where the temperature threshold is inversely related to the ambient temperature.

Different temperature thresholds may be set in different environments. The temperature threshold is inversely related to the ambient temperature, in a colder environment, i.e., an environment having a lower ambient temperature, a higher temperature threshold may be set, and the plurality of the flexible heating sheets may generate more heat. Similarly, in an environment which is not too cold, a slightly low temperature threshold may be set, heat generated by heating the plurality of the flexible heating sheets to a slightly low temperature threshold may meet requirements of the user, a power consumption of each of the plurality of the flexible heating sheets is decreased, meanwhile, a working duration of each of the plurality of the flexible heating sheets is shortened, and a service life of each of the plurality of the flexible heating pieces is prolonged.

In some embodiments, the second temperature thresholds are positively correlated to the ambient temperature. In a colder environment, i.e., an environment having a lower ambient temperature, lower second temperature thresholds may be set, that is, the plurality of the flexible heating sheets are easier to be connected. Similarly, in an environment which is not too cold, a slightly higher second temperature threshold may be set, the plurality of the flexible heating sheets may relatively not too easily to be connected, and a power consumption of each of the plurality of the flexible heating sheets may be decreased.

In the embodiments of the present disclosure and the related technical features, the embodiments and related technical features may be combined and replaced with each other without conflict.

In description of the present disclosure, terms "first" and "second" are only used for descriptive purposes, and cannot be understood as indicating or implying relative importance or implicitly indicating the number of indicated technical features. Thus, features defined with "first" and "second" may explicitly or implicitly include one or more features. In the description of the present disclosure, a meaning of "a plurality of" is two or more, unless specifically defined otherwise.

The control method of the heated clothing and the heating clothing provided by the embodiments of the present application is described in detail, and specific examples are used herein to describe principles and embodiments of the present disclosure, and the description of the above embodiments is merely used to help understand the control method of the present disclosure and a core idea thereof. At the same time, for those who skilled in the art, based on the core idea of the present disclosure, there may be changes in specific embodiments and an application scope of the present disclosure, in summary, contents of the specification should not be construed as a limitation of the present disclosure.

What is claimed is:

1. A heated clothing, comprising:

a clothing main body;

a plurality of flexible heating sheets; and a power supply line;

wherein the clothing main body comprises a front portion and a rear portion, the front portion is disposed opposite to the rear portion; the plurality of the flexible heating sheets are disposed at intervals on the clothing main body, a first part of the plurality of the flexible heating sheets are disposed at the front portion, and a second part of the plurality of the flexible heating sheets are disposed at the rear portion, and each of the plurality of the flexible heating sheets is bendable; the power supply line is electrically connected to each of the plurality of the flexible heating sheets to supply power to each of the plurality of the flexible heating sheets;

wherein the clothing main body comprises an inner layer, and the heated clothing further comprises flexible heat conduction sheets, the flexible heat conduction sheets are disposed between the plurality of the flexible heating sheets and the inner layer, and an area of each of the flexible heat conduction sheets is greater than an area of each of the plurality of the flexible heating sheets.

2. The heated clothing according to claim 1, wherein a number of the first part of the plurality of the flexible heating sheets is greater than a number of the second part of the plurality of the flexible heating sheets.

3. The heated clothing according to claim 1, wherein the heated clothing further comprises a plurality of flexible waterproof sleeves, each of the plurality of the flexible heating sheets is sleeved by one of the plurality of the flexible waterproof sleeves.

4. The heated clothing according to claim 1, wherein pockets are disposed on the front portion or the rear portion; the front portion comprises a front side and a rear side, the front side and the rear side form each of the pockets, the front side comprises a heat insulation layer, the rear side comprises a first heat conduction layer and a second heat conduction layer, and one of the plurality of flexible heating sheets is disposed between the first heat conduction layer and the second heat conduction layer.

5. The heated clothing according to claim 1, wherein pockets are disposed on the front portion; the front portion comprises a front side and a rear side, the front side and the rear side form each of the pockets, the front side comprises a heat insulation layer and a first heat conduction layer, the rear side comprises a second heat conduction layer, and one of the plurality of flexible heating sheets is disposed between the heat insulation layer and the first heat conduction layer.

6. The heated clothing according to claim 1, wherein the power supply line comprises a connecting line, power supply interfaces, and a control button; the connecting line is electrically connected to each of the plurality of the flexible heating sheets, the power supply interfaces are connected to the connecting line to supply the power to each of the plurality of the flexible heating sheets, and the control button is connected to the connecting line to control each of the plurality of the flexible heating sheets to be connected or disconnected.

7. The heated clothing according to claim 6, wherein pockets are disposed at the front portion, and the power supply interfaces are disposed corresponding to the pockets.

8. The heated clothing according to claim 7, wherein the power supply interfaces are disposed in the pockets, the pockets are configured to accommodate power supply devices, and the power supply interfaces are configured to plug into the power supply devices.

9. The heated clothing according to claim 7, wherein the front portion comprises a front side and a rear side, the front side and the rear side form each of the pockets, each of the power supply interfaces comprises a wireless charging coil, the wireless charging coil is disposed in the rear side, and the wireless charging coil is configured to wirelessly cooperate with a wireless transmitting coil of an external device for supplying power to each of the plurality of the flexible heating sheets.

10. The heated clothing according to claim 9, wherein each of the power supply interfaces further comprises a first magnetic component, the first magnetic component is disposed adjacent to the wireless charging coil, the first magnetic component is configured to magnetically connected to a second magnetic component of the external device, so as to align the wireless charging coil with the wireless transmitting coil.

11. The heated clothing according to claim 1, wherein the heated clothing further comprises a plurality of temperature sensors, at least one of the plurality of the temperature sensors is disposed on each of the plurality of the flexible heating sheets, and when a temperature collected by any one of the plurality of the temperature sensors exceeds a temperature threshold, a corresponding one of the plurality of the flexible heating sheets is controlled to stop heating.

12. The heated clothing according to claim 1, wherein the heated clothing further comprises a plurality of temperature sensors and a communication unit; at least one of the plurality of the temperature sensors is disposed on each of the plurality of the flexible heating sheets, and each of the plurality of the temperature sensors is configured to collect temperature information; the communication unit is electrically connected to the plurality of the temperature sensors and is configured to transmit the temperature information to an external device.

13. The heated clothing according to claim 12, wherein the communication unit is further configured to obtain a control instruction transmitted by the external device, at least one target heating sheet is selected from the plurality of the flexible heating sheets according to the control instruction, and the at least one target heating sheet is further controlled to stop heating or re-heating according to the control instruction.

14. The heated clothing according to claim 12, wherein the communication unit is further configured to obtain a control instruction transmitted by the external device, and a temperature threshold corresponding to each of the plurality of the temperature sensors is confirmed according to the control instruction; and when the temperature information exceeds the temperature threshold, a corresponding one of the plurality of the flexible heating sheets is controlled to stop heating.

15. The heated clothing according to claim 1, wherein each of the plurality of the flexible heating sheets comprises first flexible heating sheets and at least one second flexible heating sheet;

the power supply line comprises a first line and a second line, the first line is electrically connected to the first flexible heating sheets, the second line is electrically connected to the at least one second flexible heating sheet, and power transmitted by the first line is different from power transmitted by the second line.

16. The heated clothing according to claim 15, wherein the first line comprises a first adjusting circuit, the second line comprises a second adjusting circuit, the first adjusting circuit is capable of adjusting working power of the first flexible heating sheets, and the second adjusting circuit is capable of adjusting working power of the at least one second flexible heating sheet.

17. The heated clothing according to claim 1, wherein the power supply line comprises an increase button and a decrease button; when the increase button is triggered, working power of the plurality of the flexible heating sheets is increased and when the decrease button is triggered, working power of the plurality of the flexible heating sheets is decreased.

18. A control method of the heated clothing according to claim 1, comprising:

obtaining a temperature of each of the plurality of the flexible heating sheets;

controlling a corresponding one of the plurality of the flexible heating sheets to stop heating when a temperature of any one of the plurality of the flexible heating sheets exceeds a temperature threshold;

obtaining an ambient temperature; and adjusting the temperature threshold according to the ambient temperature, where the temperature threshold is inversely related to the ambient temperature.

* * * * *